United States Patent
Yuan et al.

(10) Patent No.: US 11,413,589 B2
(45) Date of Patent: Aug. 16, 2022

(54) BLENDER INTERLOCK

(71) Applicant: SHARKNINJA OPERATING LLC, Needham, MA (US)

(72) Inventors: Ken H. Q. Yuan, Guangdong (CN); Dash Z. Z. Hu, Guangdong (CN); Deric Z. M. Liu, Guangdong (CN); Frederick K. Hopke, Medway, MA (US); David Elentukh, Brookline, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 555 days.

(21) Appl. No.: 16/462,500

(22) PCT Filed: Nov. 24, 2016

(86) PCT No.: PCT/CN2016/107091
§ 371 (c)(1),
(2) Date: May 20, 2019

(87) PCT Pub. No.: WO2018/094646
PCT Pub. Date: May 31, 2018

(65) Prior Publication Data
US 2020/0078749 A1    Mar. 12, 2020

(51) Int. Cl.
*A47J 31/00* (2006.01)
*A47J 43/00* (2006.01)
(Continued)

(52) U.S. Cl.
CPC .............. *B01F 27/88* (2022.01); *A47J 31/42* (2013.01); *A47J 43/046* (2013.01);
(Continued)

(58) Field of Classification Search
CPC .............................. B01F 7/1695; A47J 43/046
See application file for complete search history.

(56) References Cited

U.S. PATENT DOCUMENTS

| 3,970,258 A | 7/1976 | Mantelet |
| 2015/0250360 A1* | 9/2015 | Hyp .................. B01F 7/162 366/205 |
| 2016/0158719 A1 | 6/2016 | Gushwa et al. |

FOREIGN PATENT DOCUMENTS

| CN | 101209189 A | 7/2008 |
| CN | 201360959 Y | 12/2009 |

(Continued)

OTHER PUBLICATIONS

Extended European Search Report; International Application No. 169224936.8-1004; International Filing Date: May 24, 2019; dated May 4, 2020; 8 pages.

(Continued)

*Primary Examiner* — Anshu Bhatia
(74) *Attorney, Agent, or Firm* — Burns & Levinson, LLP; Joseph M. Maraia (57) ABSTRACT

A base of a food processing system (20) includes at least one attachment (30) selectively receivable by a base (22). The base (22) includes an attachment mounting area (42) disposed with the base (22) to selectively receive the attachment (30). The attachment mounting area (42) includes a drive coupler (26) for applying a pull down force to the attachment (30). A motor is disposed with the base (22). A motor activation assembly (70) is associated with the attachment mounting area (42) and the motor. The motor is rendered operable via a vertical force applied to the motor activation assembly (70) when the attachment mounting area (42) receives the attachment (30).

18 Claims, 9 Drawing Sheets

(51) Int. Cl.
  *B01F 27/88* (2022.01)
  *A47J 31/42* (2006.01)
  *A47J 43/046* (2006.01)
  *A47J 43/07* (2006.01)
  *B01F 27/808* (2022.01)

(52) U.S. Cl.
  CPC ......... *A47J 43/0722* (2013.01); *B01F 27/808* (2022.01); *A47J 2201/00* (2013.01)

(56) References Cited

FOREIGN PATENT DOCUMENTS

| EP | 2368470 | A1 | 9/2011 |
| FR | 2908619 | A1 | 5/2008 |
| FR | 2908620 | A1 | 5/2008 |

OTHER PUBLICATIONS

PCT Notification of Transmittal of the International Search Report and the Written Opinion of the International Searching Authority, or the Declaration; International Application No. PCT/CN2016/107091; International Filing Date Nov. 24, 2016; dated Aug. 22, 2017; pp. 1-12.

\* cited by examiner

BLENDER INTERLOCK

CROSS REFERENCE TO RELATED APPLICATIONS

This application is a National Stage application of PCT/CN2016/107091, filed Nov. 24, 2016, which is incorporated herein by reference in its entirety.

BACKGROUND

The disclosure relates generally a food processing system, and more particularly, to a connection between a container of the food processing system and a base of the food processing system.

Food processing systems such as blenders rotate a processing tool (e.g. a blade assembly) within a container assembly to process food. The container is removably mountable to a blender base such that when mounted thereto, a drive coupling on the base rotates a driven coupling on the container to rotate the processing tool. In some blenders, the container is an inverted jar having a lid which includes the driven coupling on the outside and a blade assembly attached on the inside. The container has radially protruding tabs which are received in corresponding slots in the blender base. The container typically is moved vertically downwardly so that each tab enters through a vertical portion of a slot, followed by rotation of the container to move each tab through a horizontal portion of the slot.

BRIEF DESCRIPTION

According to an embodiment, a base of a food processing system includes at least one attachment selectively receivable by the base. The base includes an attachment mounting area disposed with the base to selectively receive the attachment. The attachment mounting area includes a drive coupler for applying a pull down force to the attachment. A motor is disposed with the base. A motor activation assembly is associated with said attachment mounting area and said motor. The motor is rendered operable via a vertical force applied to the motor activation assembly when the attachment mounting area receives the attachment.

In addition to one or more of the features described above, or as an alternative, in further embodiments said motor is not automatically operated when said motor activation assembly is actuated.

In addition to one or more of the features described above, or as an alternative, in further embodiments rotation of the attachment is not necessary to render the motor operable.

In addition to one or more of the features described above, or as an alternative, in further embodiments application of a continuous external force to the attachment is not necessary to render the motor operable.

In addition to one or more of the features described above, or as an alternative, in further embodiments said motor remains operable while the attachment is coupled to the base.

In addition to one or more of the features described above, or as an alternative, in further embodiments the base further comprises at least one receiving slot and a portion of said motor activation assembly is located within said at least one receiving slot.

In addition to one or more of the features described above, or as an alternative, in further embodiments said motor activation assembly further comprises: a switch operably coupled to said motor, a plunger, an actuating rod, and a plunger seat associated with said plunger and said actuating rod. The plunger seat transmits movement between said plunger and said actuating rod to selectively engage said switch.

In addition to one or more of the features described above, or as an alternative, in further embodiments comprising a detent positioned in said attachment mounting area, wherein said detent is biased into engagement with the attachment to restrict movement of the attachment relative to said base In addition to one or more of the features described above, or as an alternative, in further embodiments said detent extends from a sidewall of said base to engage a side surface of the attachment.

In addition to one or more of the features described above, or as an alternative, in further embodiments said side surface of the attachment includes a groove for receiving said detent.

In addition to one or more of the features described above, or as an alternative, in further embodiments said side surface of the attachment includes a ramp surface for moving said detent against a bias.

In addition to one or more of the features described above, or as an alternative, in further embodiments the base further comprises at least one receiving slot and said detent extends at least partially into said at least one receiving slot.

In addition to one or more of the features described above, or as an alternative, in further embodiments said detent further comprises an upper portion extending at an angle, and the attachment further comprises at least one engagement member. The upper portion of said detent being positioned vertically adjacent said at least one engagement member when the attachment is coupled to the base.

In addition to one or more of the features described above, or as an alternative, in further embodiments said detent provides an indicator that the attachment is coupled to the base.

According to yet another embodiment, a food processing system includes a base having a drive coupler rotatable about an axis of rotation and an attachment for selective coupling to said base. The attachment includes a driven coupler. Engagement between said drive coupler and said driven coupler restricts movement of said attachment relative to said base.

In addition to one or more of the features described above, or as an alternative, in further embodiments said engagement between said drive coupler and said driven coupler applies a pull down force to said attachment.

In addition to one or more of the features described above, or as an alternative, in further embodiments said drive coupler includes a first plurality of angled teeth and said driven coupler includes a second plurality of angled teeth.

In addition to one or more of the features described above, or as an alternative, in further embodiments when said drive coupler and said driven coupler are engaged, said first plurality of teeth and said second plurality of teeth are arranged in intermeshing engagement.

In addition to one or more of the features described above, or as an alternative, in further embodiments first plurality of angled teeth has a first configuration and said second plurality of angled teeth has a second configuration, said second configuration being opposite said first configuration.

In addition to one or more of the features described above, or as an alternative, in further embodiments wherein at least one of said first plurality of angled teeth and said second plurality of angled teeth includes a sidewall arranged at an angle relative to vertical.

In addition to one or more of the features described above, or as an alternative, in further embodiments wherein said angle is between about 0° and about 10°.

These and other advantages and features will become more apparent from the following description taken in conjunction with the drawings.

BRIEF DESCRIPTION OF THE DRAWING

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
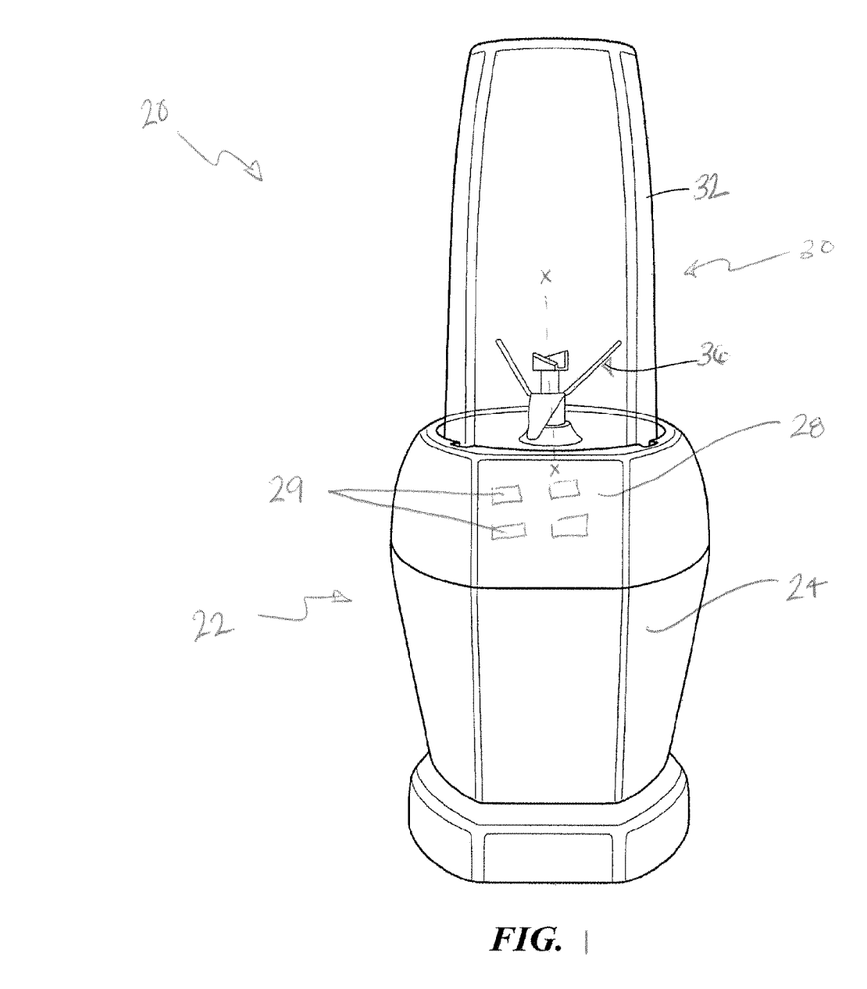
FIG. 1 is a perspective view of an example of a food processing system.
Figure 2:
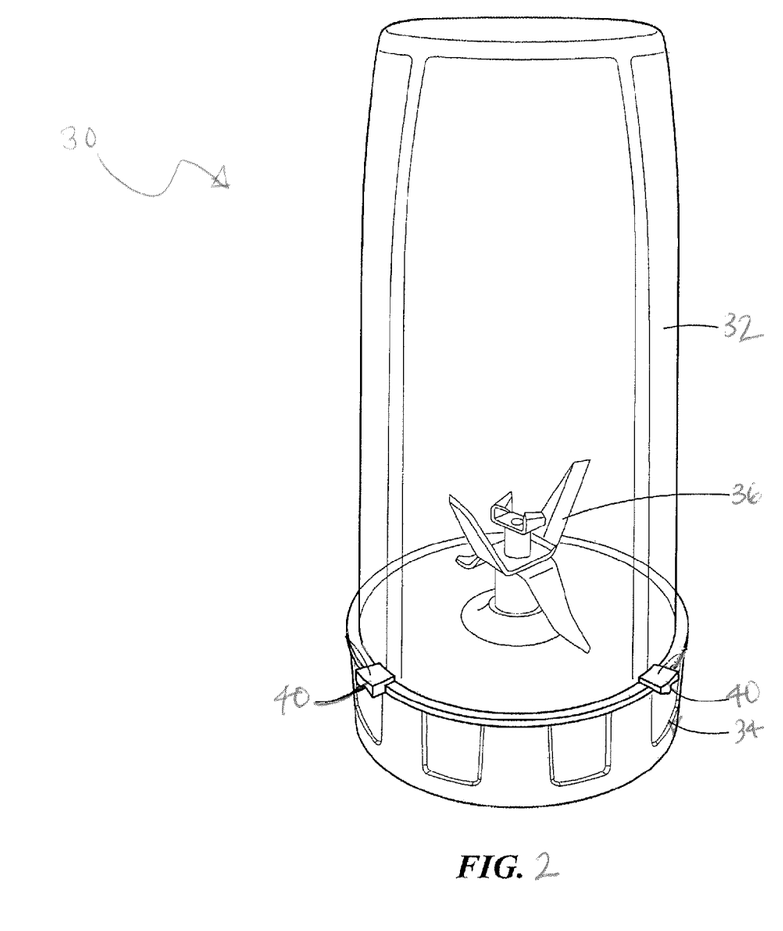
FIG. 2 is a perspective view of an example of an attachment of the food processing system of FIG. 1.

Referring now to FIGS. 1 and 2, an example of a multi-functional food processing system 20 is illustrated. In general, the food processing system 20 can be adapted to perform any food processing or blending operation including as non-limiting examples, dicing, chopping, cutting, slicing, mixing, blending, stirring, crushing, or the like. Although the food processing system 20 illustrated and described herein is a personal blender system, also referred to as a single-serve system, other types of food processing systems are within the scope of the disclosure.

The food processing system includes a base 22 having a body or housing 24 within which a motorized unit and at least one controller (not shown) are located. The base 22 includes at least one rotary component, such as a drive coupler 26 (FIG. 3) for example, driven about an axis of rotation by the motorized unit. The base 22 additionally includes a control panel or user interface 28 with one or more input devices 29 for turning the motorized unit on and off, and for selecting various modes of operation, such as pulsing, blending, or continuous food processing.

As shown, an attachment 30, such as an inverted jar 32 having a rotatable blade assembly 34 coupled thereto for example, is configured to removably mount to the base 22. In an embodiment, the inverted jar 32 and blade assembly 34 are threadably coupled together; however, other mechanisms for removably connecting the inverted jar 32 and the blade assembly 34 are also contemplated herein. When the rotatable blade assembly 34 is coupled to the inverted jar 32, at least one blade 36 is positioned within a hollow interior of the jar 32. A driven coupler 38 (FIG. 7) associated with the at least one blade 36 is positioned outside the rotatable drive assembly 34. The at least one drive coupler 26 is configured to engage the driven coupler 38 to rotate the at least one blade 36 about an axis X to process the food products located within an interior of the attachment 30. It should be understood that the attachment 30 including an inverted jar 32 and a rotatable blade assembly 34 is intended as an example only, and that other attachments, for example a jar assembly having an open top for receiving a removable lid when coupled to the base, are also contemplated herein.

The attachment 30 configured for use with the food processing base 22 typically includes one or more engagement members 40, such as tabs for example, positioned about the periphery of the attachment 30. Although four engagement members are generally illustrated in the FIGS., any number of engagement members 40 is within the scope of the disclosure. In embodiments where the attachment 30 includes an inverted jar 32 and a blade assembly 34, the engagement members 40 may extends outwardly from the jar 32, the blade assembly 34, or both.

Figure 3:
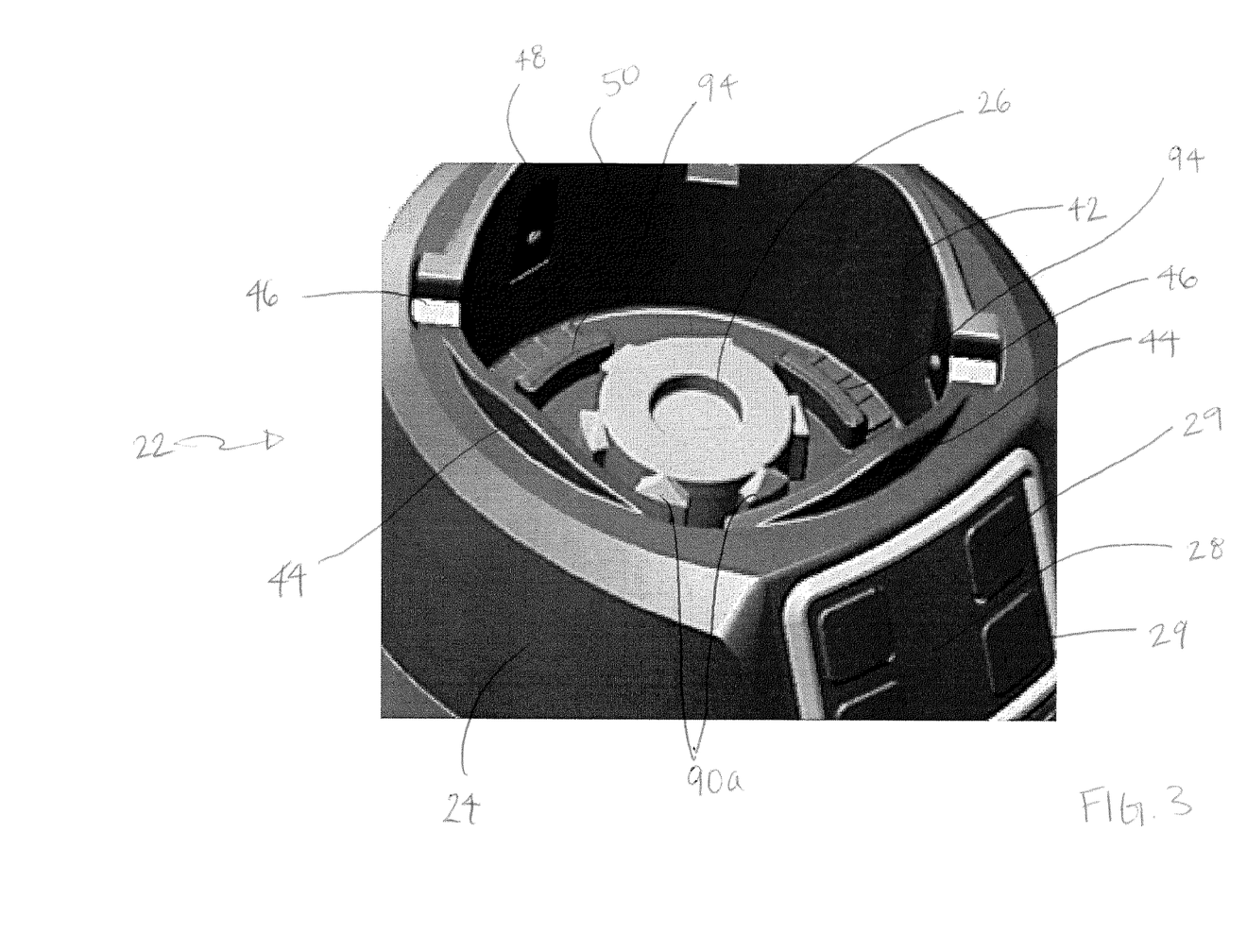
FIG. 3 is a perspective view of a base of the food processing system according to an embodiment.

With reference now to FIG. 3, the engagement members 40 protrude generally outwardly from an outer edge of a portion of the attachment 30 receivable within the attachment mounting area 42 of the base 22. The base 22 includes an upstanding collar 44 that defines the attachment mounting area 42 and includes one or more receiving slots 46 corresponding to the plurality of engagement members 40 of the attachment 30. When mounting the attachment 30 to the base 22, the user aligns the engagement members 40 with the receiving slots 46. The engagement members 40 are configured to move generally vertically within the slots 46 until coming to rest on a bottom surface 47 thereof. In certain embodiments, the collar 44 is shaped or otherwise configured to direct the engagement members 40 into the receiving slots when the attachment is placed on the base 22. The height of the collar 44 may be greatest at a central portion between two adjacent slots 46. Adjacent each side of this peak, a slope of the collar 44 extends generally to a slot 46. Accordingly, in the event that the attachment 30 is moved towards the base 22 with the engagement members 40 offset from the receiving slots 46, the slopes of the collar 44 facilitate rotation of the attachment 30 relative to the base 22 to align the engagement members with the slots 46.

Figure 4:
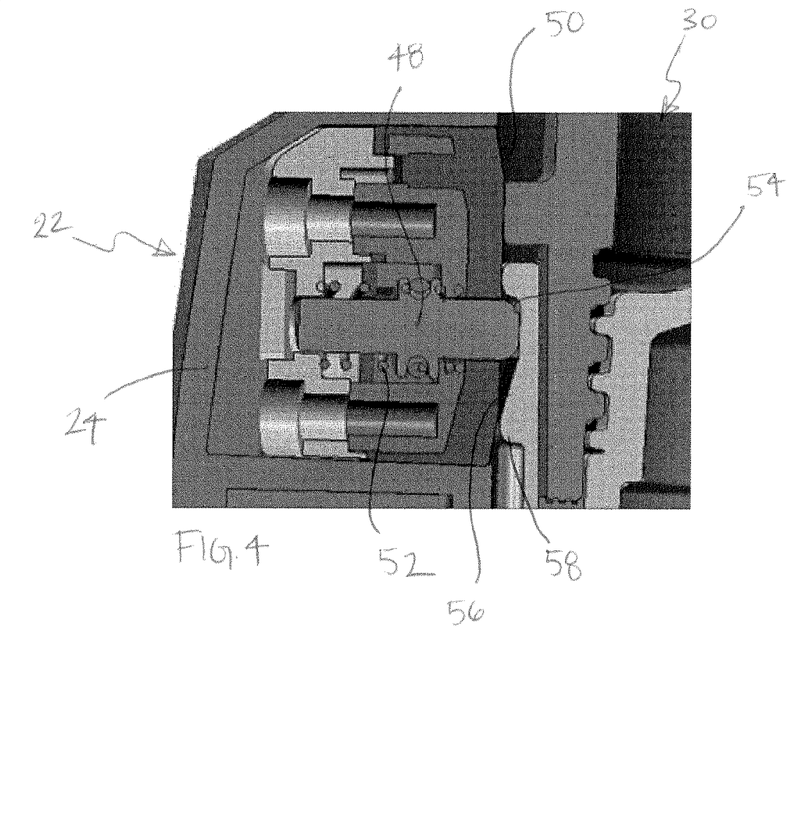
FIG. 4 is a cross-sectional view of an attachment mounting area of a base of a food processing system according to an embodiment.
Figure 5:
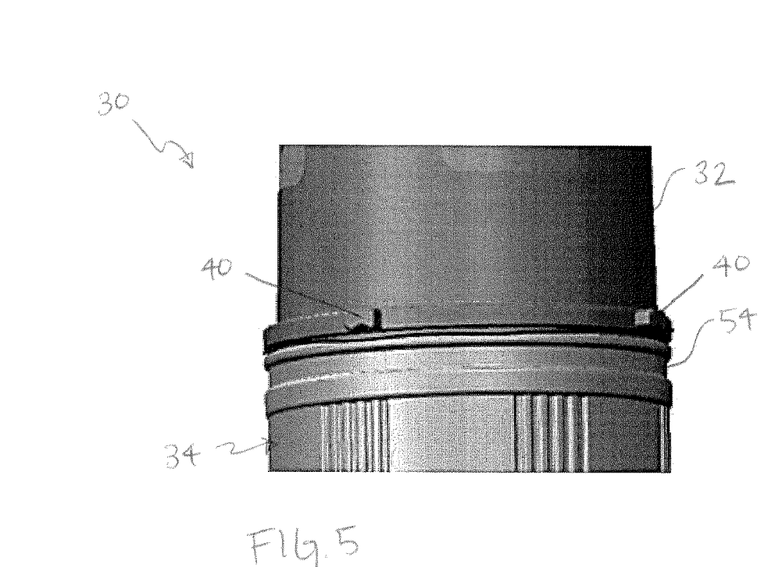
FIG. 5 is a perspective view of an attachment according to an embodiment.

In an embodiment, best shown in FIGS. 3 and 4, a side detent 48 may extend from the sidewall 50 of the attachment mounting area 42 towards an attachment 30. The side detent 48 may be coupled to a biasing member 52 for movement between an extended position and a retracted position. A groove 54 generally complementary in height to the side detent 48 is formed in a corresponding portion of the attachment 30 (FIG. 5). The attachment 30 additionally includes a corresponding ramp surface 56 adjacent the groove 54. When the attachment 30 is coupled to the base 22, an end 58 of the ramp surface 56 is configured to bias the side detent 48 to the retracted position to allow installation of the attachment 30 to the base 22. After the end 58 of the ramp 56 has moved beyond the side detent 48, the biasing force of the biasing mechanism 52 biases the side detent 48 back to the extended position, where the side detent 48 is received within the groove 54. Receipt of the side detent 48 within the groove 54 may be configured to indicate to the user, such as via an auditory or visual signal for example, that the attachment 30 is in place relative to the base 22.

Upon application of a force to the attachment 30 greater than the biasing force of the biasing mechanism 52, the ramp surface 56 gradually transitions the side detent 48 from the extended position to the retracted position. Accordingly, the contour of the ramp surface allows the attachment 30 to be easily removed from the base 22 when desired.

Figure 6:
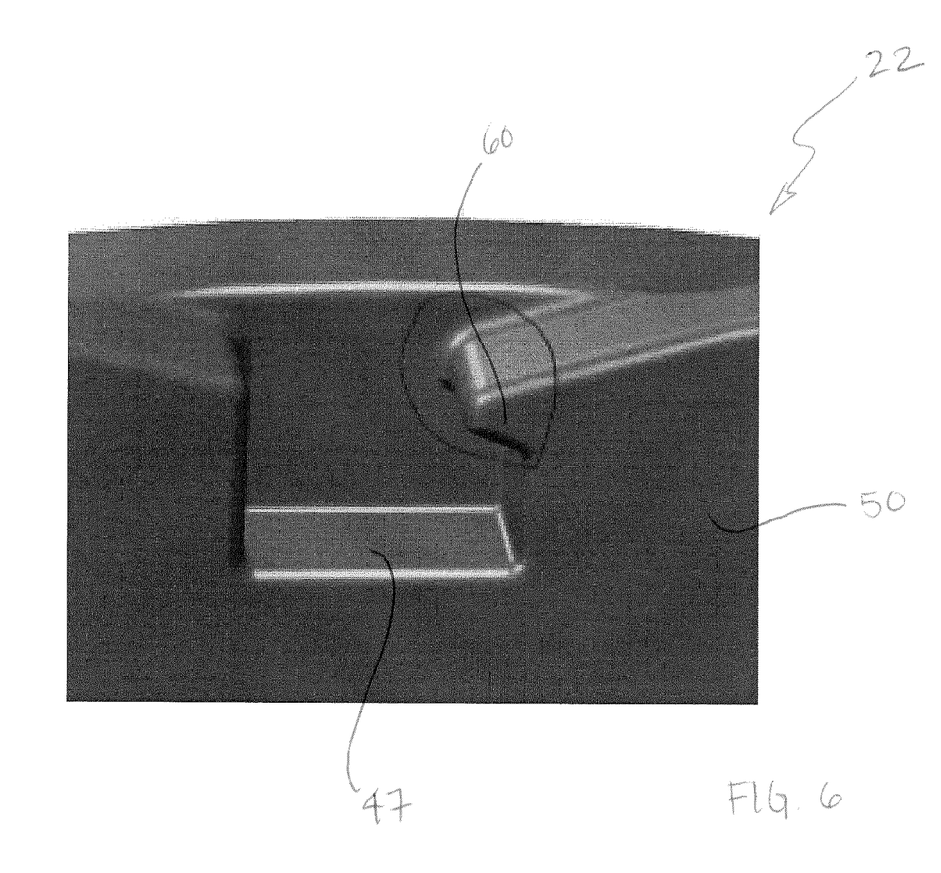
FIG. 6 is a perspective view of a receiving slot of a base of the food processing system according to an embodiment.

With reference now to FIG. 6, an example of a receiving slot 46 of the base 22 is illustrated in more detail. As shown, at least one of the receiving slots 46 includes an undercut such that a triangular feature 60 is formed adjacent a side of the receiving slot 46, near the opening thereof. The feature 60 is configured to cooperate with a corresponding angular surface on an engagement member 40 to restrict movement of the engagement member 40 from the slot 46 when operation of the food processing system 20 is initiated.

Figure 7:
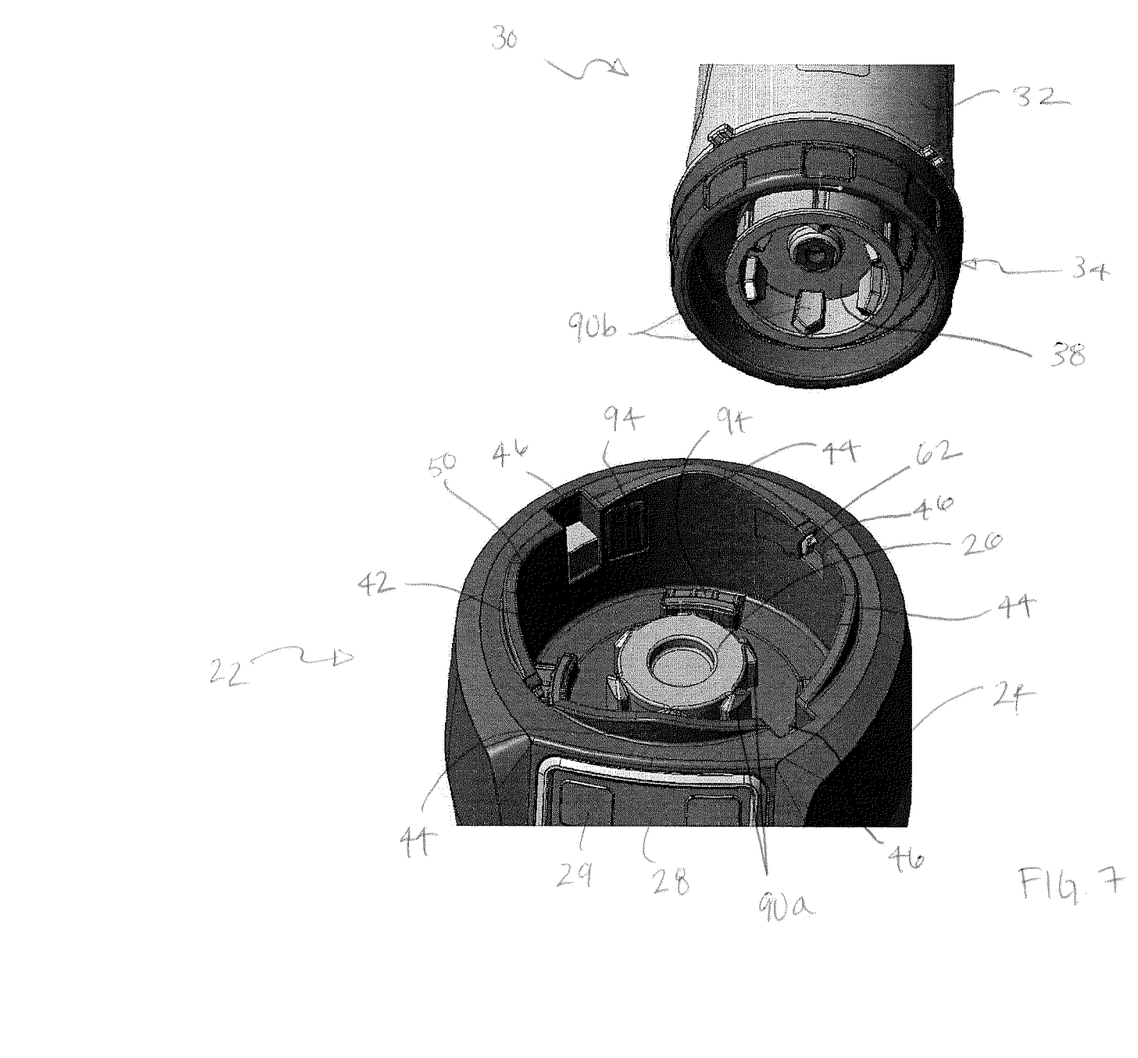
FIG. 7 is a perspective view of the food processing system during installation of the attachment to the base according to an embodiment.
Figure 8:
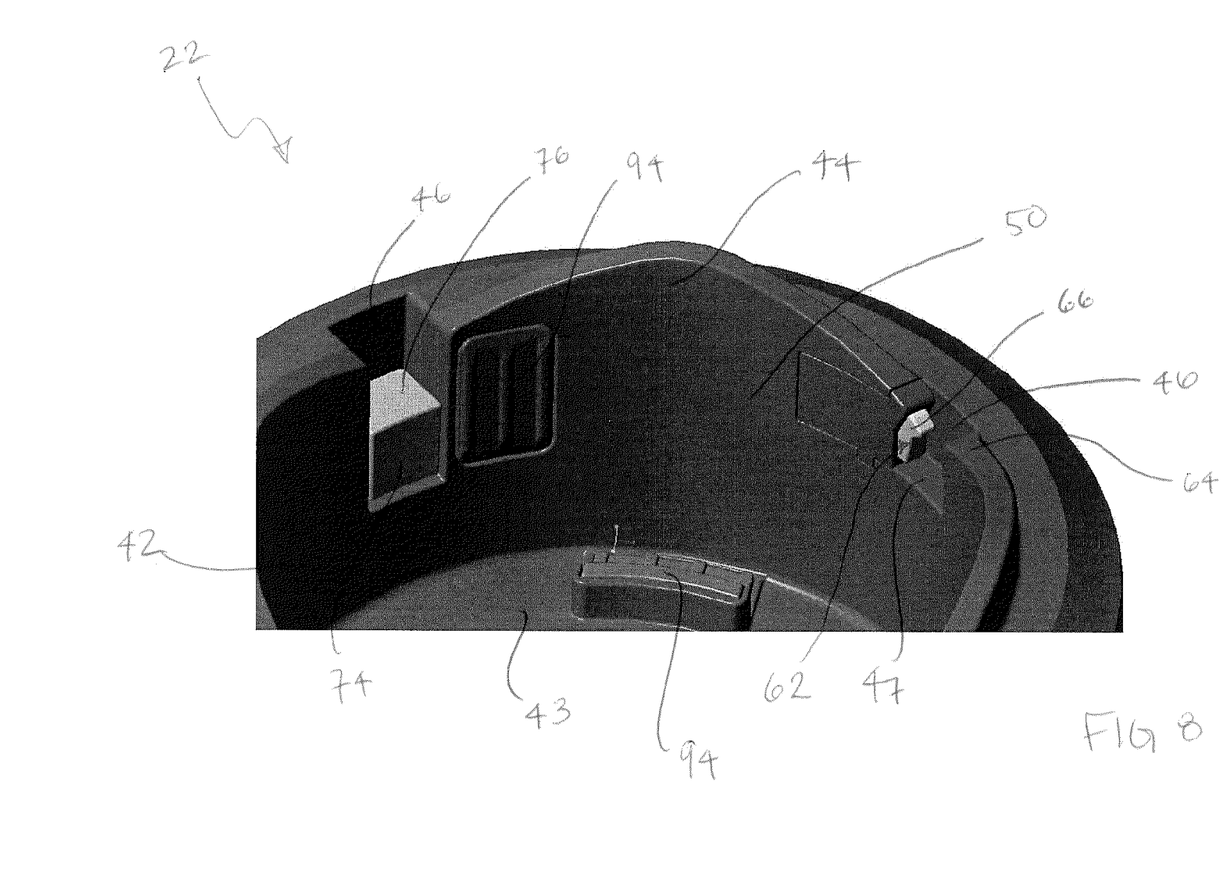
FIG. 8 is a perspective view of a base of the food processing system according to an embodiment.

Alternatively, or in addition, a detent 62 may be formed in a portion of the collar 44, generally adjacent one or more of the receiving slots 46. The detent 62 may be operably coupled to a biasing mechanism (not shown), such as a spring for example, and is movable between a first position and a second position. In the first position, as shown in FIGS. 7 and 8, the detent 62 extends at least partially into the passageway defined by the receivable slot 46. In an embodiment, the portion 66 of the detent 62 closest to the upper surface 64 of the collar 44, best shown in FIG. 8, is angled relative to the portion 66 of the detent 62 adjacent the bottom 48 of the slot 46. Because a width of the receiving slot 46 is generally equal to or only slightly larger than a width of the engagement member 40, the engagement member 40 contacts and applies a force to the upper portion 66 of the detent 62 as the attachment 30 is coupled to the base 22. The force applied by the engagement member 40 opposes the biasing force of the biasing member and causes the detent to transition to the second position.

As a result of the contour of the detent 62, once the engagement member 40 has moved within the receiving slot 46 beyond the upper portion 66 of the detent 62, the biasing mechanism biases the detent 62 back to the first normal position. When the engagement member 40 is generally adjacent the bottom 47 of the slot 46, the upper portion 66 of the detent 62 is positioned vertically above the engagement member 40. Accordingly, the biasing force of the biasing mechanism associated with the detent 62 serves to restrict movement of the engagement member 40 from within the receiving slot 46 during operation of the food processing system 20. In an embodiment, the detent 62 is configured to indicate to a user, such as an auditory or visual signal for example, that the attachment 30 is in place relative to the base 22.

Formed in the collar 44 adjacent another of the receiving slots 46 is a portion of a motor activation assembly 70. Installation of the attachment 30 to the base 22 is configured to actuate a switch 72 of the motor activation assembly 70 which completes a circuit to allow electricity to be delivered to the motor, illustrated schematically at M in FIG. 9. In some embodiments, actuation of the switch 72 is necessary but not sufficient to start operation of the motor M. For example, when the motor activation assembly 70 is actuated, a further step of pressing a button 29 of the user interface 28 may be required to initiate operation of the food processing system 20.

Figure 9:
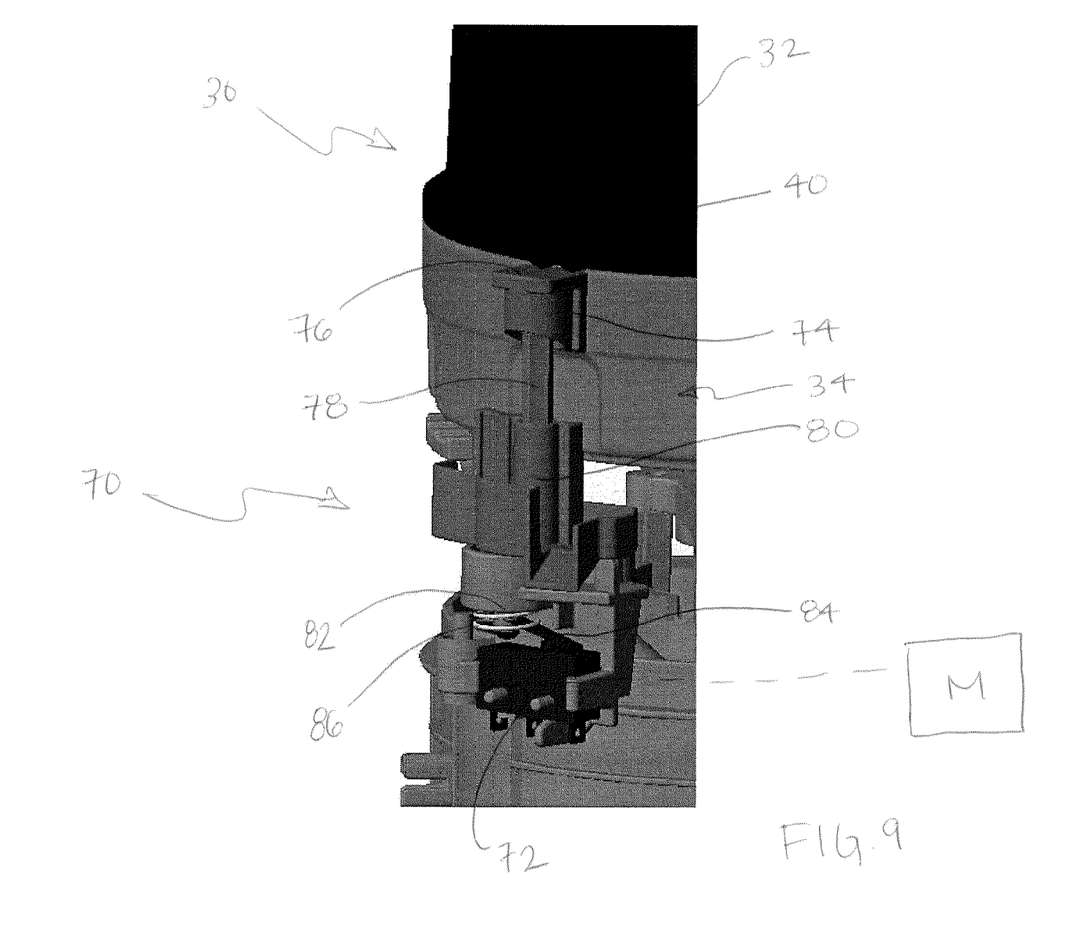
FIG. 9 is a perspective view of a motor activation assembly of the food processing system according to an embodiment.
Figure 10:
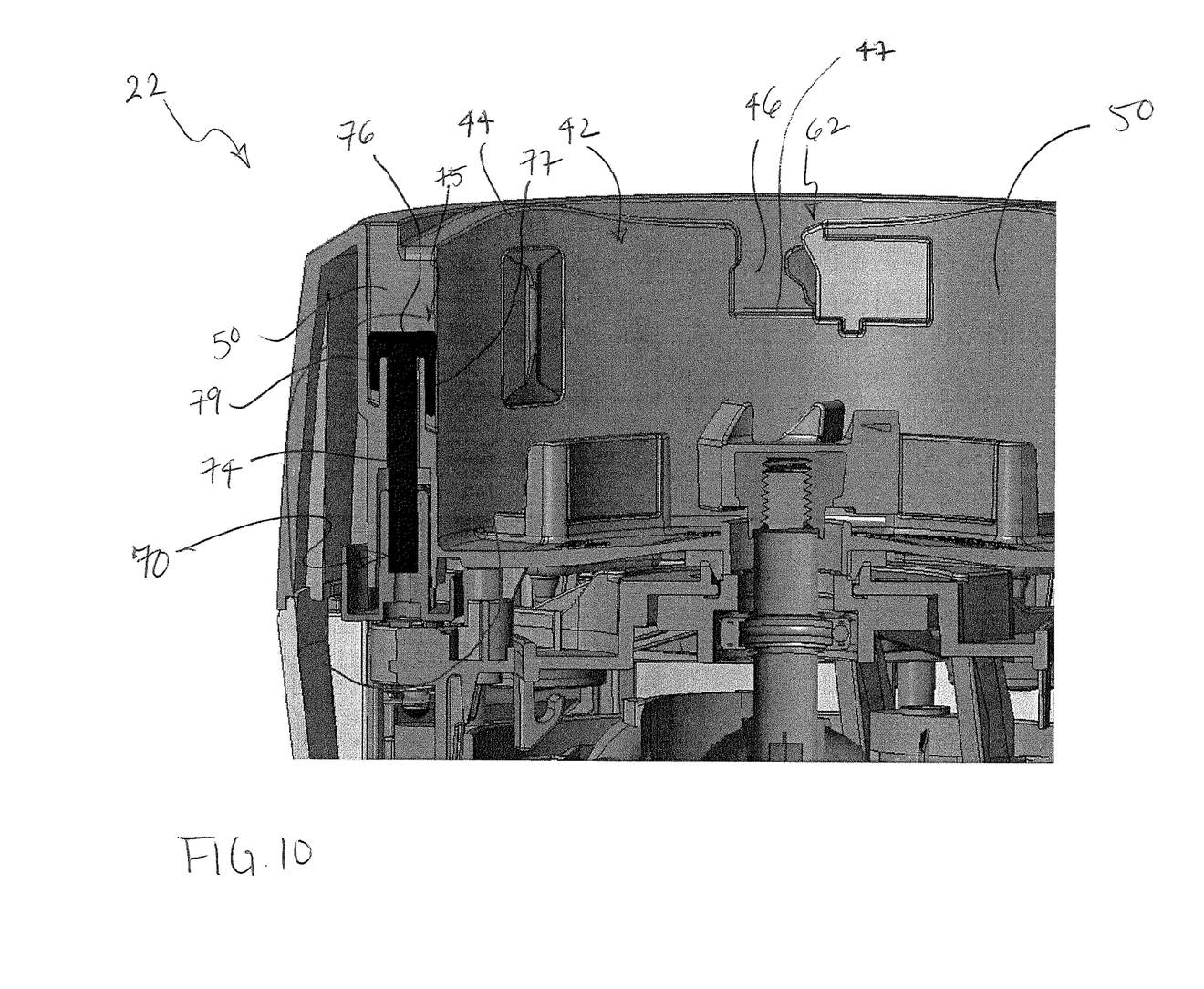
FIG. 10 is a cross-sectional view of a portion of a motor activation assembly of the food processing system according to an embodiment.

An example of the motor activation assembly 70 is shown in more detail in FIG. 9. The motor activation assembly 70 includes a plunger 74 having a generally planar surface 76 disposed within one of the receiving slots 46. In the non-limiting embodiment of FIG. 10, the planar surface 76 of the plunger 74 is part of a plunger head 75 intended to prevent food or fluid from leaking into the motor activation assembly 70. As shown, a front portion 77 of the plunger head 75 is arranged generally flush with a surface of the sidewall 50 and a back portion 79 of the plunger head 75, oriented generally parallel to the front portion 77, is aligned with a back surface of the sidewall 50. Referring again to FIG. 9, a member 78 extends downwardly from an opposite side of the plunger 74 and is partially receivable within a corresponding opening formed in a plunger seat 80. An actuating rod 82, movable via the plunger seat 80, is positioned generally adjacent to a lever 84 extending from the switch 72. As an attachment 30 is coupled to the base 22 of the food processing system 20, the engagement member 40 within the receiving slot 46 applies a force to the planar surface 76 of the plunger 74. This force is transmitted from the plunger 74 to the plunger seat 80 and actuating rod 82. The corresponding movement of the actuating rod 82 applies a force to the lever 84 in a direction opposite the biasing force of the biasing mechanism 86 coupled thereto. The downward movement of the lever 84 activates the motor activation assembly 70 by completing the circuit configured to deliver power to the motor M. Accordingly, the force generated via vertical installation of the attachment 30 relative to the base 22, and more specifically applied by the at least one engagement member 40 to the motor activation assembly 70, actuates the switch 72. Rotation of the attachment 30 relative to the base 22 is not necessary to actuate the motor activation assembly 70.

When the attachment 30 is removed from the base 22, the force applied by the engagement member 40 is removed. Accordingly, the biasing mechanism 86 will cause the lever 84 to bias back to a normal position, thereby creating a break in the circuit for supplying power to the motor M. This movement of the lever 84 in turn causes the actuating rod 82, plunger seat 80, and plunger 74 to transition back to a default position as well. It should be understood that the motor activation assembly 70 illustrated and described herein is intended as an example only, and any other motor activation assembly 70 automatically actuated in response to the vertical force generated via installation of the attachment is contemplated herein.

With reference again to FIG. 7, at least one of the drive coupler 26 of the base 22 and the driven coupler 38 of the attachment 30 includes a plurality of angled teeth 90. In the illustrated, non-limiting embodiment, the drive coupler 26 includes a first plurality of angled teeth 90a having a first orientation and the driven coupler 38 includes a second plurality of angled teeth 90b having a second orientation. As shown, the first orientation is generally opposite the second orientation. In addition, the sidewalls of the teeth 90a, 90b are may be arranged at an angled between zero degrees and ten degrees relative to vertical. The first plurality of teeth and the second plurality of teeth are generally complementary to one another and are arranged in an intermeshing engagement when the attachment 30 is coupled to the base 22. The angle of the engaged teeth 90a, 90b generates a pull down force which assists in retaining the attachment 30 in place relative to the base 22.

Dampening bumpers 94, as shown in FIGS. 3 and 7, may be mounted within the attachment mounting area 42 to reduce noise and vibration generated during operation of the food processing system 20. At least one L-shaped bumper 94 is positioned at the bottom surface of the attachment mounting area 42. Each L-shaped bumper 94 includes a cushion adapted to contact a portion of the attachment 30. The material of the cushion may be selected to provide a balance of both flexibility and stability. Alternatively, or in addition, one or more bumpers 94 are mounted to the sidewall 50 of the attachment mounting area 42 and are configured to engage a side surface of the attachment 30.

The attachment 30 of the food processing system 20 illustrated and described herein is configured to easily couple to a base 22 through a vertical movement. Further, one or more mechanisms retain the attachment 30 in position during operation of the system 20 but require allow the attachment 30 to be easily removed when desired. Additional dampening mechanisms 94 reduce the noise and vibration generated during operation of the system 20, resulting in an overall more appealing and user-friendly appliance.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A base of a food processing system that includes at least one attachment, the attachment being selectively receivable by the base, the base comprising:
   an attachment mounting area disposed within the base to selectively receive the attachment and a detent positioned in said attachment mounting area, said detent configured to be biased into engagement with the attachment to restrict movement of the attachment relative to said base, said attachment mounting area including a drive coupler for applying a pull down force to the attachment;
   at least one receiving slot;
   a motor disposed within the base; and
   a motor activation assembly associated with said attachment mounting area and said motor, said motor being rendered operable via a vertical force applied to said motor activation assembly when said attachment mounting area receives the attachment;
   wherein said detent further comprises an upper portion extending at an angle, said upper portion configured to be positioned vertically above at least one engagement member of the attachment when the attachment is coupled to the base to restrict movement of the engagement member from the receiving slot.

2. The base according to claim 1, wherein said motor is not automatically operated when said motor activation assembly is actuated.

3. The base according to claim 1, wherein rotation of the attachment is not necessary to render the motor operable.

4. The base according to claim 1, wherein application of a continuous external force to the attachment is not necessary to render the motor operable.

5. The base according to claim 1, wherein said motor remains operable while the attachment is coupled to the base.

6. The base according to claim 1, wherein a portion of said motor activation assembly is located within said at least one receiving slot.

7. The base according to claim 1, wherein said motor activation assembly further comprises:
   a switch operably coupled to said motor;
   a plunger;
   an actuating rod;
   a plunger seat associated with said plunger and said actuating rod, wherein said plunger seat transmits movement between said plunger and said actuating rod to selectively engage said switch.

8. The base according to claim 1, wherein said detent extends from a sidewall of said base to engage a side surface of the attachment.

9. The base according to claim 8, wherein said detent is configured to be received within a groove of said side surface of the attachment.

10. The base according to claim 1, wherein said detent extends at least partially into said at least one receiving slot.

11. The base according to claim 1, wherein said detent provides an indicator that the attachment is coupled to the base.

12. A food processing system comprising:
   a base including an attachment mounting area disposed within the base, the attachment mounting area including a drive coupler rotatable about an axis of rotation, the base further comprising at least one receiving slot and a detent positioned in said attachment mounting area; and
   an attachment for selective coupling to said base, said attachment including a driven coupler;
   wherein engagement between said drive coupler and said driven coupler restricts movement of said attachment relative to said base;
   wherein said detent is biased into engagement with the attachment to restrict movement of the attachment relative to said base; and
   wherein said detent further comprises an upper portion extending at an angle, said upper portion positioned vertically above at least one engagement member of the attachment when the attachment is coupled to the base to restrict movement of the engagement member from the receiving slot.

13. The food processing system according to claim 12, wherein said engagement between said drive coupler and said driven coupler applies a pull down force to said attachment.

14. The food processing system according to claim 12, wherein said drive coupler includes a first plurality of angled teeth and said driven coupler includes a second plurality of angled teeth.

15. The food processing system according to claim 14, wherein when said drive coupler and said driven coupler are engaged, said first plurality of teeth and said second plurality of teeth are arranged in intermeshing engagement.

16. The food processing system according to claim 14, wherein first plurality of angled teeth has a first configuration and said second plurality of angled teeth has a second configuration, said second configuration being opposite said first configuration.

17. The food processing system according to claim 14, wherein at least one of said first plurality of angled teeth and said second plurality of angled teeth includes a sidewall arranged at an angle relative to vertical.

18. The food processing assembly according to claim 17, wherein said angle is between about 0° and about 10°.

* * * * *